United States Patent [19]

Marks et al.

[11] Patent Number: 4,788,090
[45] Date of Patent: Nov. 29, 1988

[54] FIRE RESISTANT PLASTIC PIPE

[75] Inventors: Paul R. Marks, Hoole; Michael H. Collins, Ince, both of United Kingdom

[73] Assignee: Shell Internationale Research Maatschappij B.V., The Hague, Netherlands

[21] Appl. No.: 12,929

[22] Filed: Feb. 9, 1987

[30] Foreign Application Priority Data

Apr. 2, 1986 [GB] United Kingdom ............... 8608055

[51] Int. Cl.[4] .................. F16L 9/00; F16L 59/16
[52] U.S. Cl. ................... 428/34.5; 138/149; 285/47; 428/36.4
[58] Field of Search .......... 138/149; 285/47; 428/36

[56] References Cited

U.S. PATENT DOCUMENTS

| 3,614,967 | 10/1971 | Royston | 138/149 |
| 4,287,245 | 9/1981 | Kikuchi | 138/145 |
| 4,418,724 | 12/1983 | Fricker et al. | 138/149 |
| 4,538,834 | 9/1985 | Brady et al. | 285/47 |
| 4,590,971 | 5/1986 | Webster et al. | 138/149 |
| 4,637,637 | 1/1987 | Adorjan | 138/149 |
| 4,660,861 | 4/1987 | Argy et al. | 285/47 |

FOREIGN PATENT DOCUMENTS 1337394 11/1973 United Kingdom ............... 285/47

Primary Examiner—John E. Kittle
Assistant Examiner—James J. Seidleck
Attorney, Agent, or Firm—Jones, Tullar & Cooper

[57] ABSTRACT

A novel plastic pipe coated on the outer surface with a thermal insulating layer comprising phenolic foam, and wherein the layer is enclosed in an integrity retaining layer serving as a top or outer layer, comprising fibers, such as glassfibers, which fuse together upon exposure to fire, thereby providing mechanical strength to the foam when the pipe is exposed to fire.

3 Claims, 1 Drawing Sheet

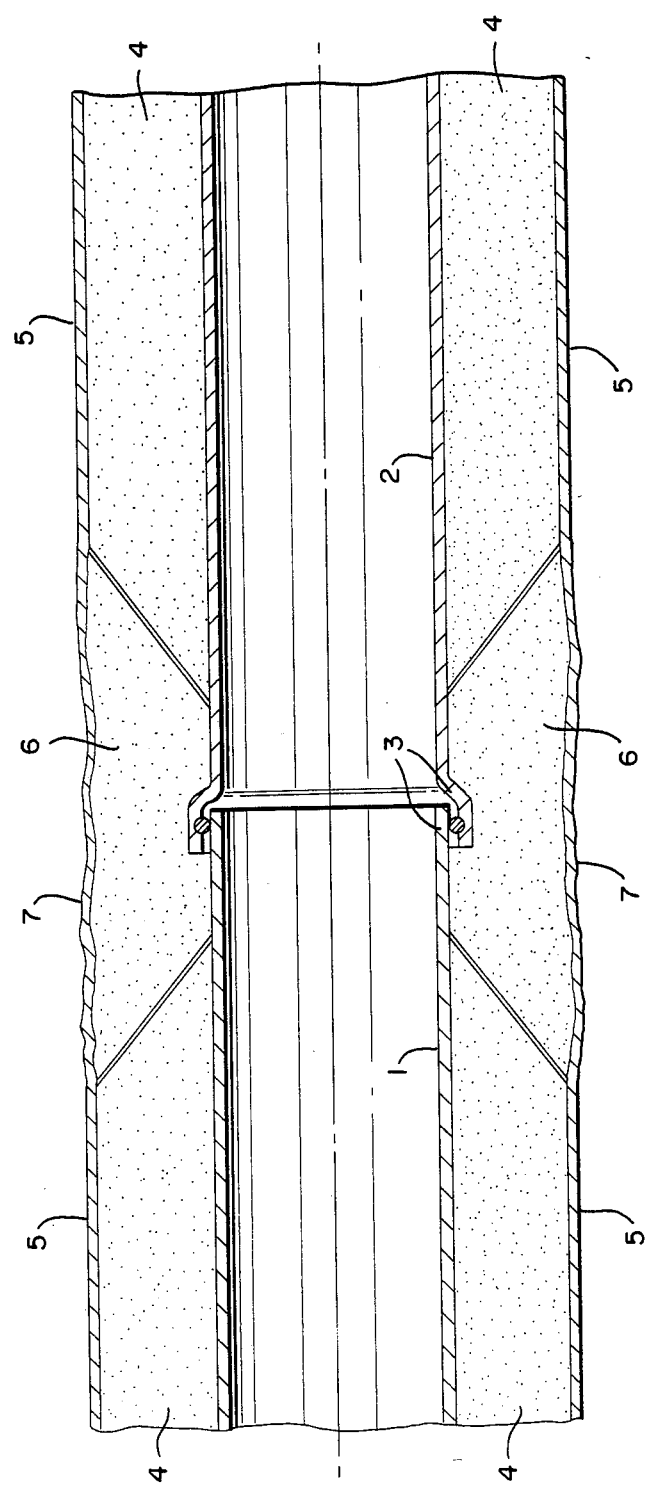

FIRE RESISTANT PLASTIC PIPE

FIELD OF THE INVENTION

The invention relates to a fire resistant plastic pipe.

BACKGROUND OF THE INVENTION

The present restrictions on the use of plastic materials in flowline circuits in hazardous areas e.g. on board ships or on offshore platforms are imposed mainly because of the poor fire resistance of these materials relative to metallic materials.

Numerous attempts have already been made to improve the fire resistance of plastic flowlines such as by covering the wall thereof with various types of coatings. During the course of experiments it has been found that many coatings provide a temporary protection to the pipe wall in case of fire but that the coatings tend to fail after exposure to fire during an extended period of time.

An object of the invention is to provide a novel plastic pipe of which the wall is protected against fire even if the pipe is exposed to fire during an extended period of time.

SUMMARY OF THE INVENTION

In accordance with the invention, this object is accomplished by a plastic pipe which is coated at the outer surface thereof with a thermal insulating layer comprising phenolic foam which layer is enclosed in an integrity retaining layer comprising fibers which fuse together upon exposure to fire thereby providing mechanical strength to the foam if the pipe is exposed to fire.

The present invention provides a plastic pipe coated at the outer surface thereof with a thermal insulating layer comprising phenolic foam wherein said layer is enclosed in an integrity retaining layer comprising fibers which fuse together upon exposure to fire thereby providing mechanical strength to the foam if the pipe is exposed to fire.

In the invention, the integrity containing layer preferably consists of either an epoxy impregnated woven glassfiber mat or a phenolic impregnated woven glassfiber mat.

BRIEF DESCRIPTION OF THE DRAWING

FIG. 1 is a cross-sectional view of the novel fire resistant coated pipe.

DETAILED DESCRIPTION OF A PREFERRED EMBODIMENT

The pipe shown in FIG. 1 comprises two plastic pipe sections 1 and 2 joined by a socket and spigot joint 3. A major portion of the outer surface of each pipe section 1 and 2 is coated with a continuous, thermal insulating layer 4 of phenolic foam. This layer 4 is overwrapped with an integrity retaining layer 5 of glassfiber reinforced epoxy the layer 5 thus serving as a top or outer layer. In the region of the joint 3, the pipe wall is surrounded by a series of phenolic foam blocks which have been cut to shape to a series of complementary elements 6, and to fill-up the gap between the adjacent continuous foam layers 4. The elements 6 are held in place by an overlay layer 7 comprising a glassfiber reinforced epoxy, which together with the integrity retaining layer 5, forms a continuous layer of glassfiber reinforced epoxy surrounding the entire body of phenolic foam.

Phenolic foam is generally regarded as a suitable thermal insulation at room temperature. Although phenolic foams do burn, they are inherently difficult to ignite and tend to carbonize slowly under the influence of direct flame, while emitting only very low levels of smoke.

During the course of experiments with plastic pipes of which the outer wall was insulated by a phenolic foam coating, it became apparent that even though the foam charred very slowly, under the influence of direct flame, the foam became very weak mechanically and that the updraft of the fire caused much of the insulation to be blown away. Detailed examination of the damaged insulation revealed that under the influence of flames a phenolic foam coating has the tendency to crack and that the cause of the cracking is the contraction of the char layer over the undamaged foam. Due to the relatively low toughness of the phenolic foam the cracks produced in this way tend to penetrate to the pipe surface and cause an increase in heat flux thus reducing the effectiveness of the protection.

The present invention is at least partly based on the insight that if the tendency of phenolic foam to crack under the influence of flames can be suppressed, the foam is able to maintain its insulating properties in case of fire so that it can perform as a fire protective material.

It was found that overwrapping the phenolic foam insulation layer with a glassfiber reinforced mastic enhanced the fire resistant properties of the foam to an unexpected large degree. Experiments revealed that after exposure to fire, the glassfiber overwrapping had fused together to form a tough protective layer to the foam, which though charred, had retained a large proportion of its thermal and mechanical properties. The presence of an overwrap comprising fibers which fuse together is essential to retain the mechanical and thermal properties of the phenolic foam if the pipe is exposed to fire. It will be appreciated that in addition to, or instead of, glassfibers the fibrous overwrap may contain other fibrous materials provided that upon exposure to fire at least some of the fibers fuse together and to the phenolic foam. Impregnating the fibrous overwrap with a mastic, such as an epoxy or phenolic resin, has the advantage that during normal operation of the pipe, the foam is protected against occasional impacts. In case of fire, the mastic will burn away and it is the effect of the fusing fibers that provides mechanical strength to the foam.

Furthermore, chopped glassfibers may be added to the phenolic foam to further suppress propagation of cracks through the foam upon exposure to fire. The plastic pipe itself may be made of any suitable synthetic material, such as an epoxy or polyester resin. The pipe wall may be reinforced by one or more layers of glassfibers.

The fire resistant pipe thus fabricated is suitable for use in all tubular constructions where fire resistance is needed, such as in glassfiber reinforced plastic pipes having rectangular or circular shape or in large diameter pressure or storage vessels. Besides use of the pipe in ships or on offshore platforms, the pipe may also find application in onshore flowline circuits where fire resistance is required.

What is claimed is:

1. A plastic pipe coated at the outer surface thereof with a thermal insulating layer consisting of a phenolic foam wherein said layer is enclosed in an integrity retaining layer serving as a top layer, said integrity retaining layer, comprising fibers which fuse together upon exposure to fire thereby providing mechanical strength to the foam if the pipe is exposed to fire, said integrity retaining layer consisting of a member of the group consisting of an epoxy impregnated woven glassfiber mat and a phenolic impregnated woven glassfiber mat.

2. The pipe of claim 1, wherein the pipe is made of a glassfiber reinforced resin.

3. A plastic pipe consisting of a plurality of interconnected pipe sections, and wherein a major part of the wall of each section of the pipe is covered by a continuous layer of thermal insulating material comprising phenolic foam, and wherein the region of each joint interconnecting a pair of adjacent pipe sections is covered by a series of complementary elements of thermal insulating material comprising phenolic foam, and further wherein the outer surface of said elements and said continuous layer is covered by a continuous integrity retaining layer serving as a top layer, said integrity retaining layer comprising fibers which fuse together upon exposure to fire.

* * * * *